United States Patent [19]

Arai et al.

[11] Patent Number: 4,866,470
[45] Date of Patent: Sep. 12, 1989

[54] CAMERA

[75] Inventors: Takuya Arai; Keiichi Yoshiura, both of Tokyo, Japan; Isao Nozawa, deceased, late of Tokyo, Japan, by Yoshiko Nozawa, heir

[73] Assignee: Fuji Photo Film Co., Ltd., Kanagawa, Japan

[21] Appl. No.: 197,125

[22] Filed: May 19, 1988

[30] Foreign Application Priority Data

May 19, 1987 [JP] Japan ................................. 62-75323

[51] Int. Cl.⁴ ............................................. G03B 17/02
[52] U.S. Cl. .................................. 354/288; 354/219; 354/289.1
[58] Field of Search ............ 354/202, 219, 288, 289.1; 150/52 J

[56] References Cited

U.S. PATENT DOCUMENTS

| 3,731,586 | 5/1973 | Meazza | 354/219 X |
| 3,878,548 | 4/1975 | Ettischer | 354/219 X |
| 4,547,054 | 10/1985 | Bridges | 354/289.1 X |
| 4,766,451 | 8/1988 | Fujimura et al. | 354/288 |

Primary Examiner—A. A. Mathews
Attorney, Agent, or Firm—Young & Thompson

[57] ABSTRACT

A camera which can prevent a photographic objective in the camera from being covered with the fingers of a photographer. In the camera, around the photographic objective in the front surface of the camera, there is formed a projected portion, a recessed portion or the like that can be perceived by the sense of touch. In photographing, when the photographer's fingers approach the photographic objective, then they come into contact with the projected portion or the like to tell the photographer that the photographic objective is near the fingers. This eliminates the possibility of the photographic objective being covered with the fingers.

7 Claims, 5 Drawing Sheets

CAMERA

BACKGROUND OF THE INVENTION

1. Field of the Invention

The present invention relates to a camera which can prevent a photographer's finger from coming into touch with a photographic objective by mistake in photographing.

2. Description of the Related Art

When a photograph is taken by use of a small-size camera, there is a possibility that a photographer's finger may come into touch with the photographic objective of the camera or the finger may be positioned in front of the camera in photographing. If a shutter release operation is performed in this condition, then the finger is photographed in a film so that a desired object cannot be photographed.

Especially, in a camera which is designed such that the photographic objective of the camera cannot be projected out beyond the front surface of the camera body, during photographing the photographer's finger may come into touch with or cover the photographic objective easily, which makes it impossible to photograph a desired object and makes the photographic objective dirty. In the U.S. Pat. No. 4,547,054, there is arranged a pressure sensitive sensor ring in the neighborhood of a photographic objective which can be put into operation when the photographer's fingers are located too closely to the objective to give an alarm that the fingers are too close to the objective. However, the sensor ring is expensive and, therefore, it cannot be used in a lowcost camera. Further, in the U.S. Pat. No. 3,731,586, there is disclosed an embodiment in which a low-cost camera is covered with an outer case, however, it is characterized in that a finder is foldable. That is, no description can be found as to prevention of covering of the photographic objective by the photographer's fingers.

SUMMARY OF THE INVENTION

The present invention aims at eliminating the drawbacks found in the above-mentioned prior art cameras.

Accordingly, it is an object of the invention to provide a camera which is capable of giving a tactual alarm to a photographer that a photographer's finger is too near to a photographic objective when the photographer's finger comes too near to the photographic objective.

In order to achieve the above object, according to the invention, there is provided a camera which is provided with tactual alarm means in the periphery of a photographic objective thereof so that a tactual alarm can be given to a photographer when the photographer's finger is too near to the photographic objective in photographing.

In the present camera, there are provided at least on the right and left sides of the photographic objective in the substantially flat front surface of the camera with tactual alarm means such as projections, recesses or the like which can be perceived by the sense of touch and, therefore, when the photographer's finger comes into touch with the tactual alarm means, the photographer can perceive that the photographer's finger is near the photographic objective, which can reduce the possibility of the photographic objective being carelessly covered with the finger.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein.

DETAILED DESCRIPTION OF THE INVENTION

Detailed description will hereunder be given of the preferred embodiment of a camera according to the present invention with reference to the accompanying drawings.

Figure 1:
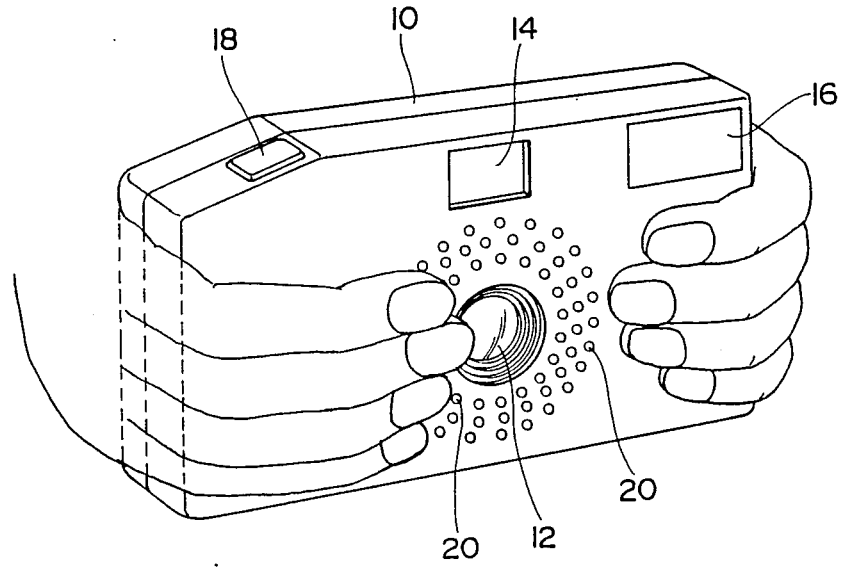
FIG. 1 is a perspective view of a camera according to the invention.

A camera shown in FIG. 1 is constructed in a thin shape so that it can be easily put into a pocket or the like and the camera includes a camera body 10. The camera body 10 is provided in the front surface thereof, which includes no great projections so as to provide a substantially flat surface for easy insertion into a pocket or the like, with a photographic objective 12 which is disposed at a position receded back from the front surface of the camera body 10. Also, in the front surface of the camera body 10, there are provided a finder 14, a strobe 16 and the like. Further, there is arranged a shutter button 18 on the upper surface of the camera body 10.

In the neighborhood of the photographic objective 12, as shown in FIG. 1, there are provided a large number of small projections 20, 20, ... on the front surface of the camera body 10.

With the illustrated embodiment according to the invention constructed in the above-mentioned manner, as illustrated, when the fingers of a photographer holding the camera touch the photographic objective 12 in photographing, then the tip ends of the photographer's fingers are brought into contact with one or more of the projections 20, whereby the photographer can know from the the touch to the projections 20 that the tip ends of the photographer's fingers are too near the photographic objective 12. Since the photographer can keep the tip ends of the photographer's fingers away from the photographic objective 12 thanks to this, the photographer is able to photograph with no possibility of the photographic objective 12 being covered with the photographer's fingers. This eliminates the possibility that the shutter button 18 may be released by mistake while the photographic objective 12 is covered with the fingers.

Figure 2B:
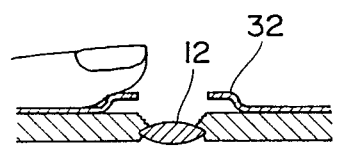
FIG. 2 (A) is a perspective view to show the manufacturing process of a camera according to the invention which is stored within an outer box; and, FIG. 2 (B) is a partially sectional view to show projections in the outer box; and, FIGS. 3 through 7 are perspective views, respectively illustrating another embodiments according to the invention which ar respectively stored in the respective outer boxes.
Figure 2A:
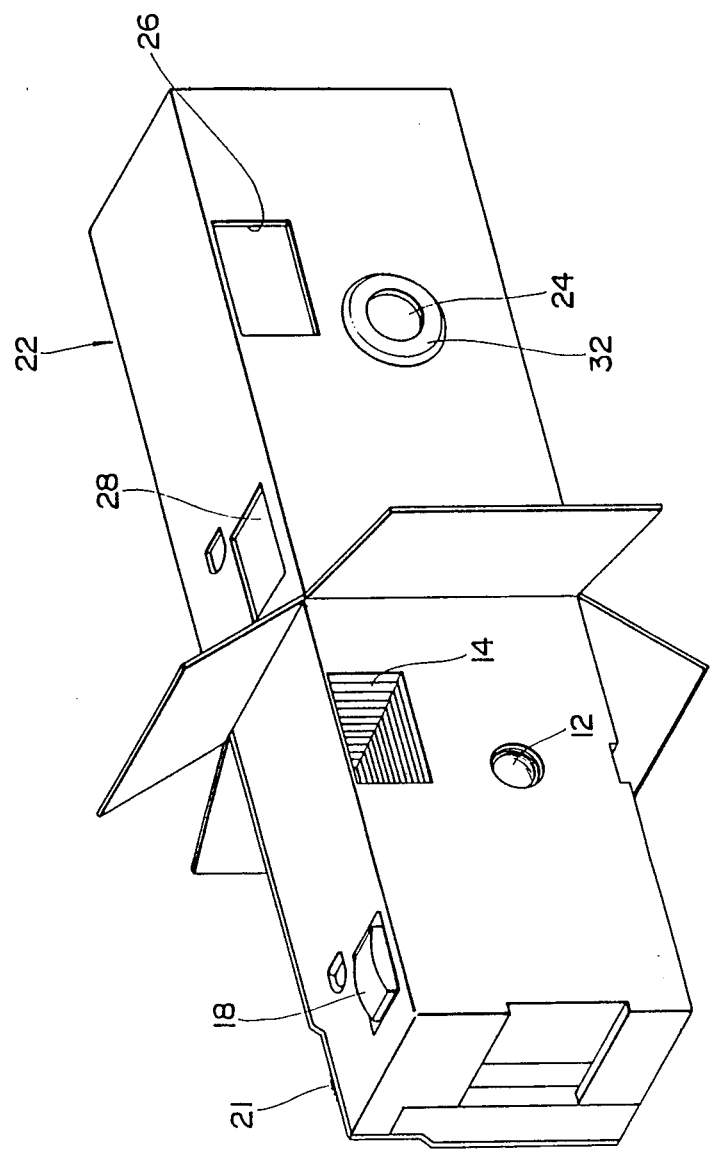

In FIG. 2 (A), there is shown a camera in which a camera body 10 having a rectangular parallelepiped shape is covered by an outer box 22 having a rectangular parallelepiped shape in a factory. Referring first to the camera body 10, reference numeral 12 designates a photographic objective, 14 represents an opening for a finder, 18 denotes a shutter release button, and 21 stands for a film winding knob.

The outer box 22 is formed of a material such as a cardboard, a thin plastic sheet or the like that is suitable for embossing and the like. The outer box 22 is formed with a circular opening 24 greater in diameter than the photographic objective 12 in a position corresponding to the photographic objective 12, a rectangle-shaped opening 26 in which the finder 14 is disposed, and a shutter release button opening 28 in which the shutter release button 18 is located.

Further in the outer box 22, there is formed in the neighborhood of the circular opening 24 a ring-shaped projected portion 32 that is formed by the well-known embossing. The embossed projection 32, as shown in FIG. 2 (B), is not in contact with the photographic objective but is disposed slightly apart right and left therefrom.

In the illustrated embodiment of the invention constructed in the above-described manner, as shown in FIG. 2, when the photographer's fingers come close to the photographic objective, then the ring-shaped projected portion 32 provided in the outer box 22 can tell the photographer that the photographer's fingers are too close to the photographic objective 12, so that the photographer can pay attention to the positions of the fingers, for example, the photographer can change the positions of the fingers. Thanks to this, therefore, there is eliminated the possibility that the photographic objective 12 may be touched by the fingers of the user of the camera.

Referring now to FIGS. 3 through 7, there are shown other embodiments of a camera of a type using an outer box according to the invention. An embodiment shown in FIG. 3 includes a ring-shaped projected portion 32 and a U-shaped projected portion 34 located outwardly of the projected portion 32, that is, this embodiment has a two-stage projection structure.

Figure 4:
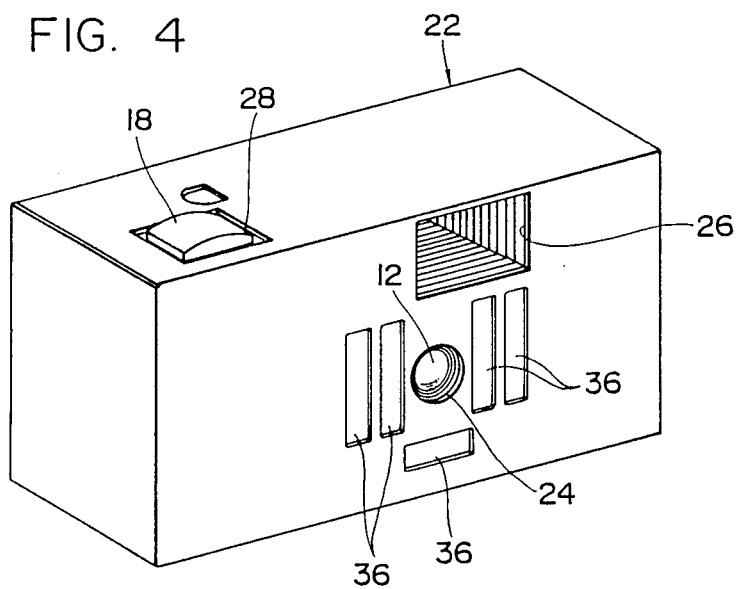

In an embodiment shown in FIG. 4, there are formed a plurality of rectangular notches 36, 36, . . . in the neighborhood of and, in particular, at least on the right and left sides of the photographic objective, so that the level differences caused by cutting out the notches can call the attention of the photographer. It should be noted here that the shape and number of the notches are not limited to those shown in the illustrated embodiment.

Figure 5:
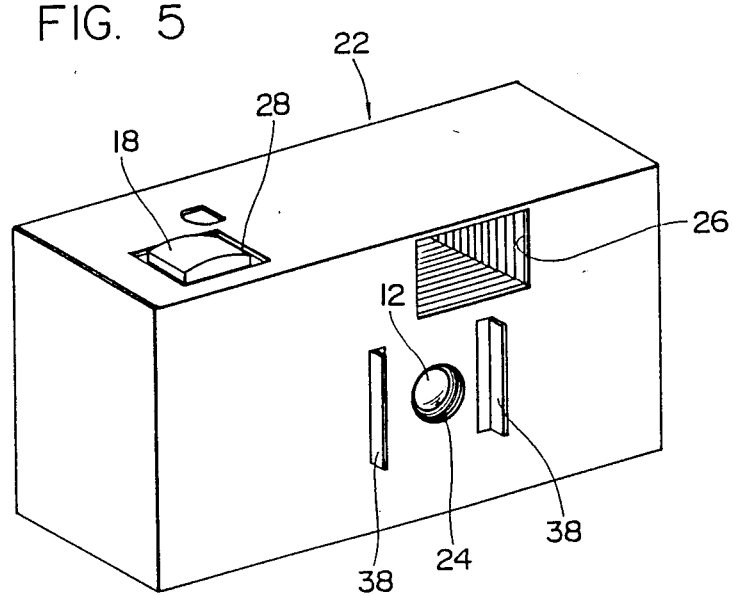

In an embodiment shown in FIG. 5, in the two adjacent portions of the photographic objective 12 in the outer box 22, the outer box 22 is cut in a rectangular shape in such a manner that three sides thereof are cut off from the outer box 22 while the remaining side thereof is in rigid contact with the box 22 and then the thus cut-off sides are raised to thereby form projected pieces 38, 38, and the projected pieces 38, 38 are used to provide tactual alarm means.

Figure 6:
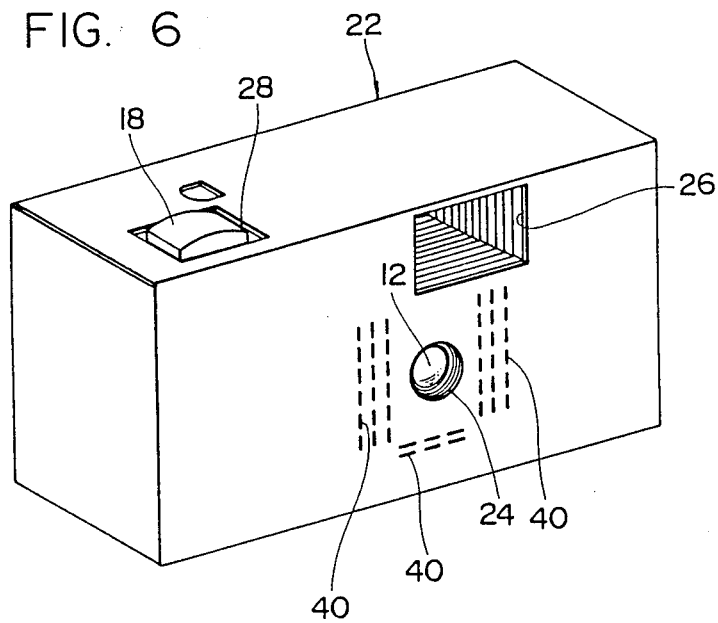

Also, in an embodiment shown in FIG. 6, in the neighborhood of the photographic object 12 in the outer box 22, there are formed discontinuous uneven likes, for example, perforations 40, 40 which can be used to call the photographer's attention to the position of the photographic objective.

Figure 3:
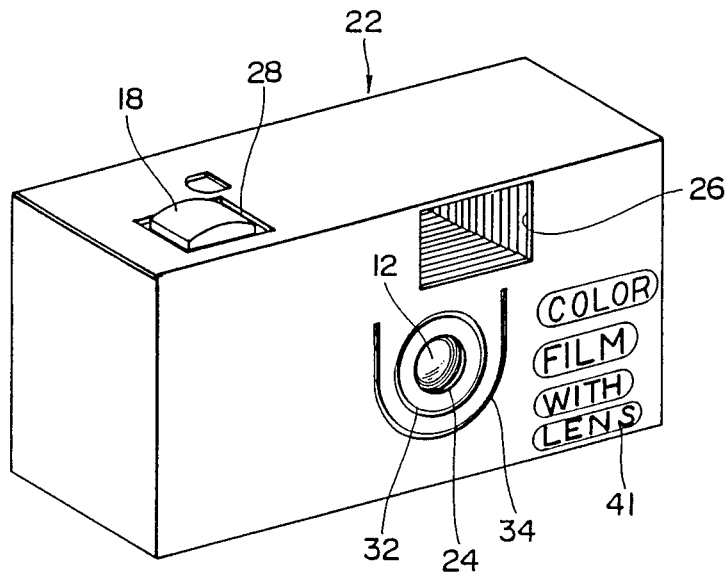

Further, as shown in FIG. 3 in the neighborhood of the lens opening 24 on the front surface of the outer box 22, display characters and illustrations may be laid out and then the characters 41 may be treated by embossing or by similar means so that they can be slightly projected out.

According to a method which utilizes the field patterns of the portions to be embossed as mentioned above, the display characters can be made prominent remarkably and also a more natural design can be obtained when compared with other methods in which recesses or projections such as the before-described projections 34, notches 36, projected pieces 38 and perforations 40 are added to the outer box 22.

Figure 7:
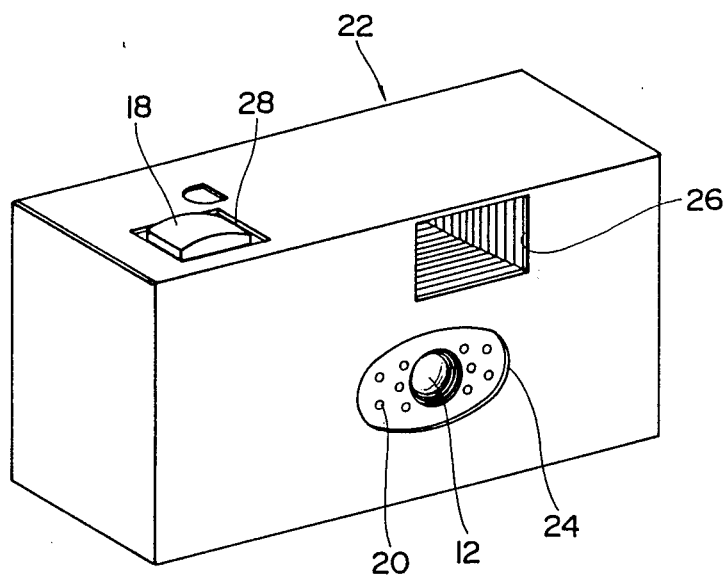

Also, it ca be easily understood that the same effect can also be obtained in a case wherein the camera including the projections in the front surface thereof as shown in FIG. 1 is inserted into the outer case of the above-mentioned type so that the projections are exposed in the notches in the outer case as shown in FIG. 7.

The illustrated embodiment in which the camera body is covered with the above-mentioned outer box is greatly effective when it is used a film unit system with lens (it is named "Utsurundesu" in Japanese) that is manufactured and sold by the present applicant. In such film unit system with lens, a photographic objective is provided in a unit body with a built-in film, that is, the photographic objective is not projected out. Therefore, the outer box can be applied to the system with ease. It is preferred that such film unit system with lens is supplied at such costs that are almost the same with an ordinary film, that is, the film unit with lens must be manufactured at a low price, and thus expensive and complicated tactual alarm means is not suitable for such film unit. In view of this, the application of the present invention has a great significance. In such film unit, a back cover is fixedly secured with a film being loaded in the main body of the film unit, which prevents a user from taking out the film at her or his own discretion.

As has been described hereinbefore, according to a camera in accordance with the invention, since there is provided tactual alarm means around the photographic objective of the camera which utilizes the sense of touch by the photographer, the photographer can know the position of the camera lens or the photographic objective by means of the tactual sense of the photographer's fingers in photographing and, therefore, there is eliminated the possibility that the shutter may be released by the photographer while the photographic objective is covered with the photographer's fingers.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A camera including a substantially flat front surface with a photographic objective not projecting out from the camera front surface, said camera comprising:
    an outer box covering the camera and having an opening through which said photographic objective is exposed; and
    tactual alarm means provided on said outer box on opposite horizontal sides of said opening for letting a photographer know that the fingers of said photographer are too close to said camera photographic objective while said photographer is holding said camera.

2. A camera as set forth in claim 1, wherein said tactual alarm means comprises a ring-shaped projecting portion formed in said outer box about said opening.

3. A camera as set forth in claim 1, wherein said tactual alarm means comprises at least one recess cut formed in said outer box.

4. A camera as set forth in claim 1, wherein said tactual alarm means comprises at least one projection formed in said outer box by turning up at least one portion of said outer box.

5. A camera as set forth in claim 1, wherein said tactual alarm means comprises at least one perforation formed in said outer box.

6. A camera including a substantially flat front surface with a photographic objective not projected out from the front surface, covered integrally with a box-shaped outer case with an opening for exposure of an external member for operating the camera, and usable in the outer case covered state, said camera comprising:
   a view frame opening formed fixedly in said outer case for exposure of a view frame provided in said camera;
   a photographic objective opening formed in said outer case for exposure of said photographic objective; and,
   recess means formed in said outer case in the neighborhood as well as right and left of said photographic objective of said camera and touchable by the fingers of a photographer to give said photographer a tactual alarm that said photographer's fingers are too close to said photographic objective when said photographer holds at least one of the right and left of said camera covered with said outer case.

7. A camera including a substantially flat front surface with a photographic objective not projected out from the front surface, covered integrally with a box-shaped outer case with an opening for exposure of an external member for operating the camera, and usable in the outer case covered state, said camera comprising:
   a view frame opening formed fixedly in said outer case for exposure of a view frame provided in said camera; and,
   recess means formed in said outer case in the neighborhood of as well as right and left of said photographic objective of said camera for exposure of said photographic objective and projections provided on said camera front surface.

* * * * *